Jan. 15, 1946. C. R. SACCHINI 2,393,194
COMBINATION CONVERTER AND WINDOW UNIT
Filed Dec. 23, 1942 3 Sheets-Sheet 1
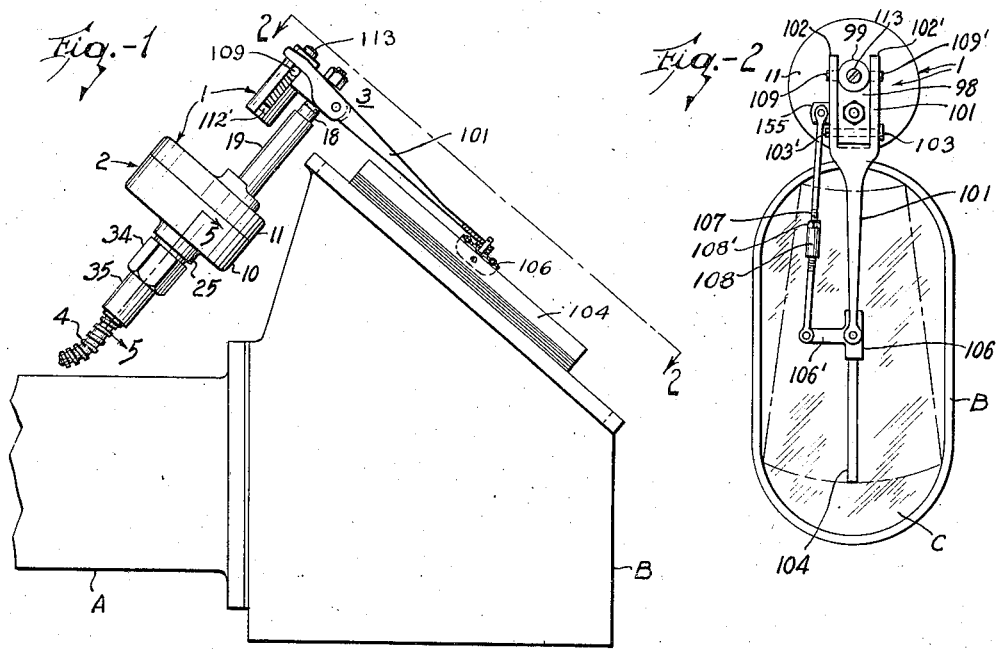
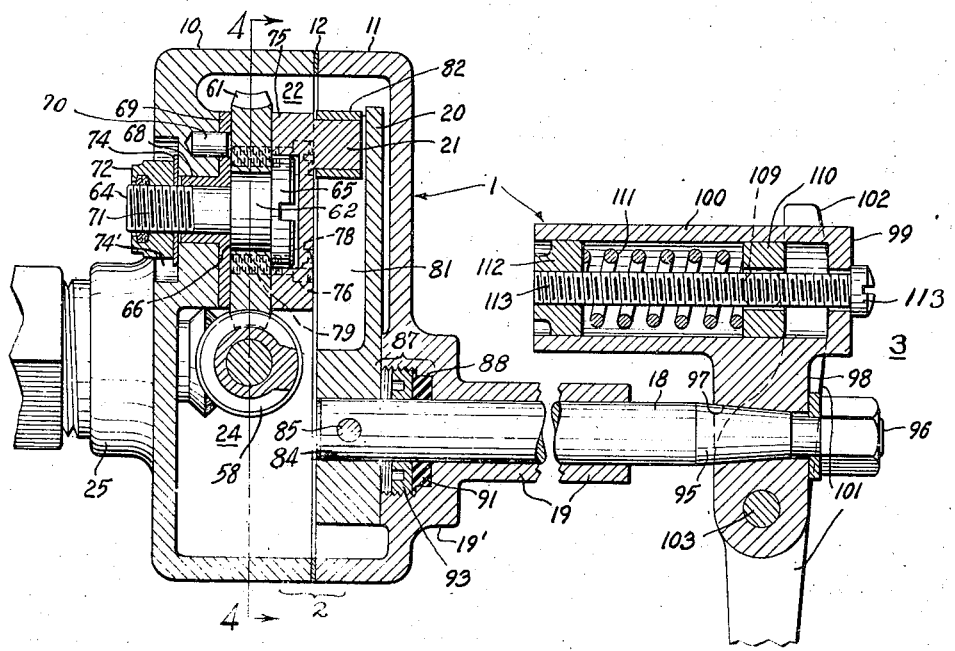
INVENTOR
COLUMBUS R. SACCHINI
BY
George M. Soule
ATTORNEY Jan. 15, 1946.　　　C. R. SACCHINI　　　2,393,194
COMBINATION CONVERTER AND WINDOW UNIT
Filed Dec. 23, 1942　　3 Sheets-Sheet 2

INVENTOR
COLUMBUS R. SACCHINI
BY
George M. Soule
ATTORNEY

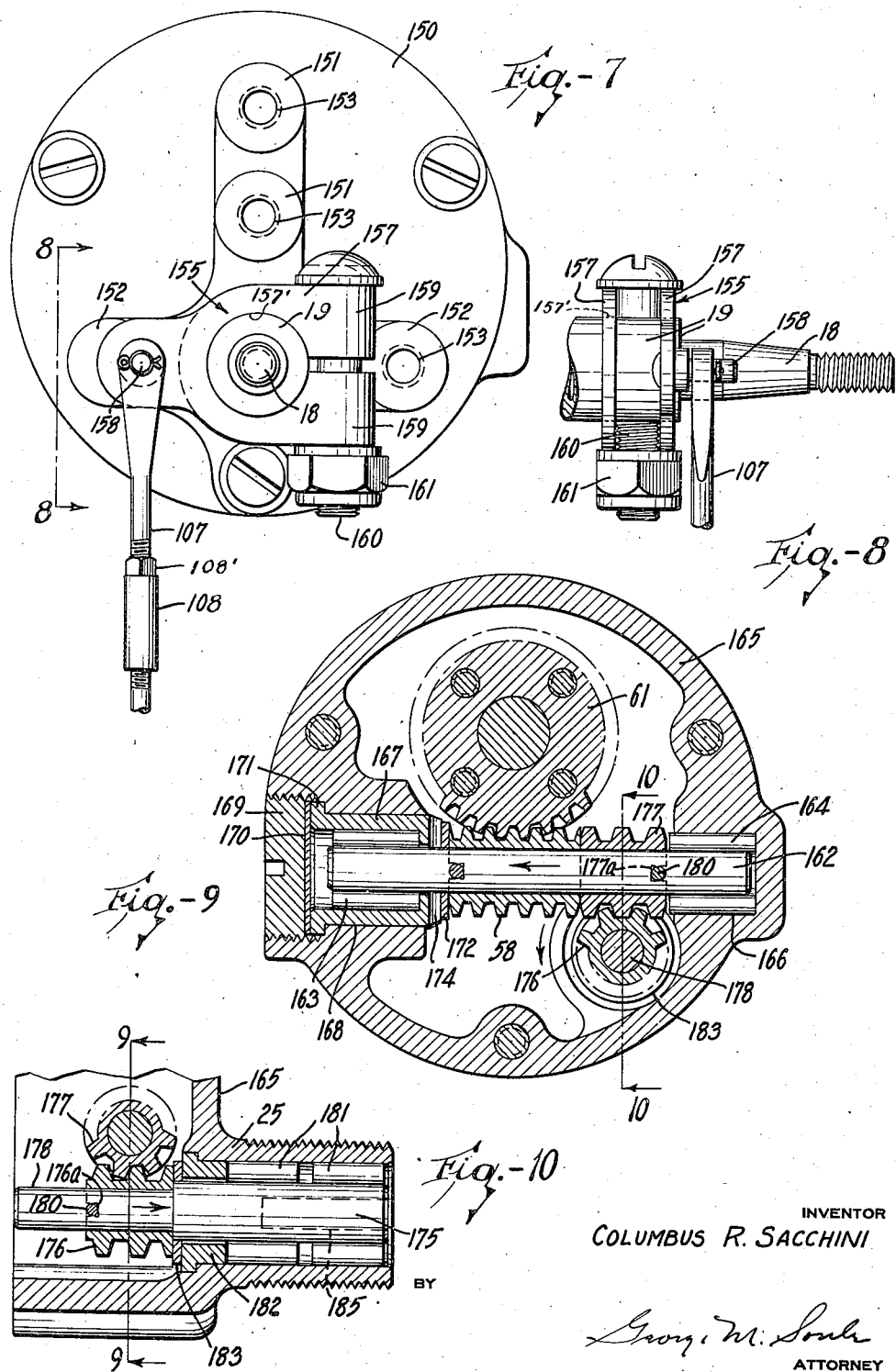

Patented Jan. 15, 1946

2,393,194

UNITED STATES PATENT OFFICE 2,393,194

COMBINATION CONVERTER AND WINDOW UNIT

Columbus R. Sacchini, Euclid, Ohio, assignor to The Marquette Metal Products Company, Cleveland, Ohio, a corporation of Ohio Application December 23, 1942, Serial No. 469,901

3 Claims. (Cl. 15—253)

The general object of this invention is to provide certain improvements in or relating to motion converter mechanism units, usable, for example, to drive window or windshield wiper mechanisms on aircraft or other vehicles. A more specific object is to provide a simple, efficient, sturdy, and compact unitary mechanism for converting unidirectional rotary motion directly into alternate rotary and, preferably, substantially simple harmonic motion.

A further object is to provide a motion converter unit usable for window or windshield wiper mechanisms and analogous uses, wherein a single unitary housing encloses mechanism for converting rotary motion into substantially simple harmonic alternate rotary motion.

Another object is to provide a combined and unitary motion converter mechanism and window wiper unit of small size and capable of operating efficiently at relatively high speed so that it may be easily mounted in confined spaces on aircraft or other vehicles and perform properly without requiring the use of subsidiary mechanisms.

Other objects include the provision of a motion converter unit for purposes such as indicated above which unit: (a) can be made economically entirely or nearly entirely from non-magnetic and generally light weight materials so that the unit, regardless of its position on (e. g.) an aircraft, will have practically no effect on the compass of the ship, irrespective of proximity thereof to the converter unit; (b) will operate properly for long periods of time—as on long flights—without likelihood of requiring any attention or repair; (c) in which the essential working parts can be easily and quickly assembled and maintained in proper free working relationships; (d) in which the number of thrust bearings is reduced substantially to a minimum; (e) in which the outgoing and ingoing shafts are substantially parallel to each other; (f) has simple and efficient oil sealing assemblies; and (g) obviates the necessity for complicated subsidiary mechanism in order to obtain the desired oscillating motion from unidirectional rotary motion.

A further object is to provide a novel mounting for a wiper blade control element whereby the shape and location of the field of operation of the blade can be adjusted as will be explained later.

Still another object is to provide a combined motion converter and window unit mechanism wherein operative alignment of an ingoing shaft and a worm shaft can be effected without maintenance of close manufacturing limits and wherein the mountings for certain of the shafts are arranged for substantially friction-free operation of said shafts.

Other objects and features will become apparent from the following description of a preferred form shown in the drawings, in which:

Fig. 1 is a more or less diagrammatic small scale elevation of the window wiping mechanism of this invention, in one form, showing one relative position of the mechanism with respect to a typical gun sight such as used on military aircraft;

Fig. 2 is a similar small scale plan view of said mechanism and associated gun sight as though viewed as indicated by the line 2—2 of Fig. 1;

Fig. 3 is a sectional elevational view of the motion converter unit taken generally through the center of the mechanism;

Fig. 7 is a front elevation of a modified form of converter mechanism for use interchangeably with that of Figs. 1 to 6, the view showing also an adjustable mounting for a wiper blade control link and a portion of said link;

Fig. 8 is a detail elevational view of the link mounting as though viewed as indicated by the line 8—8 on Fig. 7;

Fig. 9 is a vertical sectional view (taken similarly to Fig. 4 but from the opposite direction) showing the modified form of converter mechanism, and Fig. 10 is a detail sectional view as indicated by the line 10—10 on Fig. 9.

Figure 4:
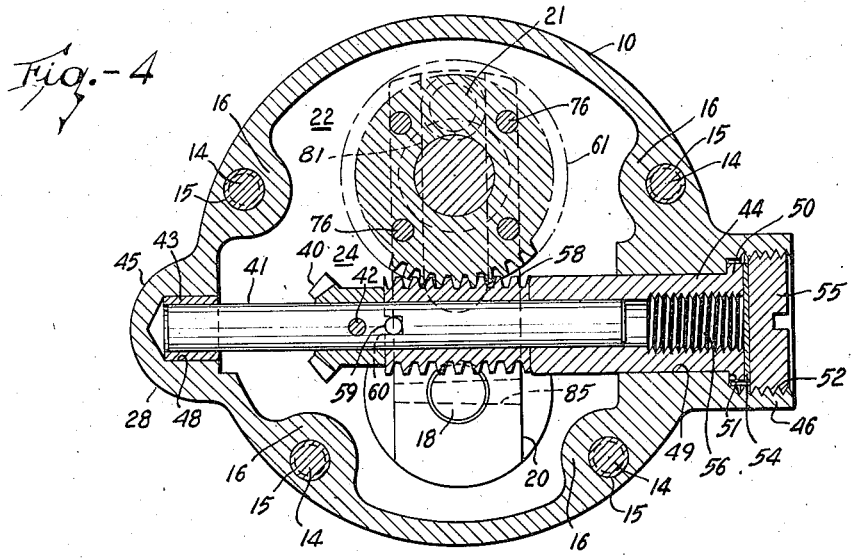
Fig. 4 is a sectional elevational view of the motion converter unit taken generally as indicated at 4—4 on Fig. 3.

In Figs. 1 and 2 a typical gun sight tube A and associated gun sight B are shown for the purpose of illustrating one convenient mounting position for the window or windshield wiping mechanism 1 hereof in connection with that particular type of apparatus. The window wiping mechanism shown comprises a motion converter and window unit 2 and window wiping unit 3.

The gun sight B has a body portion provided with a transparent window C adapted, for example, to form a part or section of the surface of a generally spherical dome type gun canopy (not shown) such as utilized in numerous different positions on military aircraft. The window wiping mechanism 1 is adapted to be mounted above the gun sight tube A and behind the gun sight B in which position the mechanism 1 would be disposed within the closely fitting canopy. Because of the limited space available, it is desirable that the ingoing shafting enter the motion converter and window unit 2 on the opposite side thereof from the outgoing shafting for the window wiping unit 3 and be driven as by a flexible shaft 4 attached to a motor (not shown) which may be mounted on the gun sight tube A. Also it is sometimes desirable that the unit 2 be driven directly by a motor mounted directly on said unit. The window wiping mechanism 1 may be mounted on the aircraft or other vehicle by supporting it on an appropriate bracket (not shown) projecting from the gun sight tube A or the main housing of gun sight B as desired.

In general, the problems encountered in connection with installations on the order of that indicated by Figs. 1 and 2 are similar to those involved in windshield wiping equipment particularly for aircraft; and, additionally, problems are presented by space peculiarities as will be evident from Fig. 1 taken in connection with known general knowledge of gun and gun sight emplacements in military aircraft.

Considerable effective and positive power is required at the wiper blade; and, both from the standpoint of minimizing weight and enabling clear vision as well as from the standpoint of non-interference with other essential apparatus, the equipment must be relatively small and compact. Consequently, prior devices in which rotary motion was converted to reciprocatory motion and then converted to oscillatory motion in another unit cannot be used satisfactorily in many confined spaces. Electric motors or other prime movers must be of small size, capable of fairly high speed, and placed as nearly out of the way as possible. The above are merely illustrative of the numerous problem factors such as had to be taken into consideration in the development represented by the present invention.

The casing or housing of the motion converter unit 2 may comprise generally a hollow body 10 which may be an aluminum casting complemented by a hollow head body member 11 of similar material secured to the body 10 at a suitable joint, including a gasket 12 as by appropriate cap type screws 14 (Fig. 4) with heads operatively abutting the head body member 11 and shanks extending through peripherally spaced opennigs in inwardly thickened portions of the head 11 into threaded holes 15 in corresponding inwardly thickened portions 16 of the body 10. The space enclosed by the body 10 and head 11 is adapted to retain oil for lubricating the moving parts to be described.

The main purpose of the head 11 is to support the outgoing shafting of the motion converter unit 2 which comprises a wiper drive arm shaft 18 which passes through a tubular extension 19 of readily variable length integral with the head 11. The shaft 18 is driven by and supports an arm 20 which is somewhat analogous to a slotted crosshead of a scotch yoke. Said arm 20 is driven by a crank pin 21 of a worm wheel and crank plate assembly 22 driven by the flexible shaft 4 through a drive gearing assembly 24 comprising miter gears and worm and worm wheel gears as described below.

Figure 5:
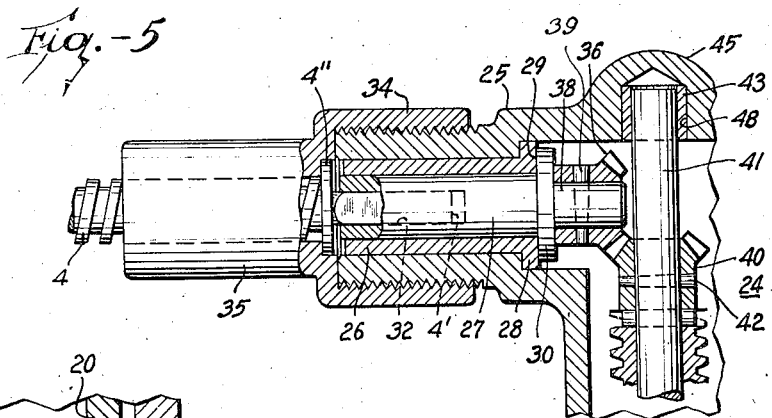
Fig. 5 is a sectional view taken generally as indicated at 5—5 in Fig. 1 and showing the preferred manner of connecting the converter unit to a prime mover.

The gearing assembly 24 comprises a tubular extension 25 of the body 10 which supports an incoming drive shaft 27 and combined thrust plate and bearing member 26 (flanged sleeve) snugly seated in the bore of the extension 25 (Fig. 5). The flanged sleeve 26 is of wear resisting but non-magnetic metal and the flange 28 is in sliding contact with an annular shoulder 29 formed by a narrow enlarged portion 30 of the incoming drive shaft 27 received within the sleeve 26. The outer end of the drive shaft 27 has a non-circular socket 32 adapted to receive a complementary terminal part 4' of the flexible torque shaft 4 (Fig. 1) or a similar part of a motor torque shaft (not shown). An internally threaded enlarged collar 34 of a connector 35 of the flexible shaft 4 is screwed over the outer end of the tubular extension 25. The connector turns freely on a terminal casing portion 4'' of the flexible shaft and provides an oil-tight seal at the outer end of the shaft 27.

A miter gear 36 is secured on a reduced inner end portion 38 of the shaft 27 by a taper pin 39 and meshes with a miter gear 40 secured on a transverse worm drive shaft 41. The shoulder 29 is held in sliding engagement with the flange 28 by the reaction of the gear 36 on the gear 40.

The miter gear 40 is secured on the shaft 41 by a taper pin 42, and the shaft 41 is rotatably supported by suitable non-magnetic sleeve bearings 43 and 44 (Fig. 4) retained in a somewhat spherical extension 45 and a tubular extension 46, respectively, of the body 10. The sleeve bearing 43 is pressed into a circular socket 48 internally of the extension 45, and the sleeve bearing 44 is in the form of a flanged sleeve pressed into a counterbored opening in the tubular extension 46 concentric with the socket 48.

The flange 50 of the sleeve 44 operatively abuts against the annular shoulder 51 formed by the internally threaded counterbored portion 52 of the opening 49. A sealing gasket 54 fits against the outer face of the flange 50 in the counterbored portion 52 and is retained in position by a retainer nut or plug 55 threaded into the counterbored portion 52 flush with the exterior face of the tubular extension 46. The opening in the sleeve 44 is threaded as at 56 near its outer end so that it may be withdrawn from the housing 10 by means of a complementary threaded bolt or the like (not shown).

A worm 58 is secured on the worm drive shaft 41 between the miter gear 40 and the flanged sleeve 44 by a pin 59 which extends through the shaft 41 and is received in diametrically opposed rectangular notches 60 in the end of the worm 58. One end of the worm 58 slidably engages the inner end of the flanged sleeve 44 and the other end abuts against the gear 40. Therefore, since the shaft 27 is retained in position by the reaction of the gear 40 on the gear 36, both the shaft 41 and the shaft 27 are retained in position by the thrust afforded by the flanged sleeve 44 and the flanged sleeve 26. By the use of the pin 59 and complementary rectangular notches 60, the length of the gear 40 and the worm 58 as well as the spacing between the pins 42 and 59 are not critical.

The worm 58 is in constant mesh with a worm wheel or gear 61 of the worm wheel and crank plate assembly 22. The worm wheel turns freely on an enlarged portion 62 of a bearing and supporting pin 64 (Fig. 3) having a head portion 65 adjacent the hub of the worm gear and an annular shoulder at 66 abutting a combined thrust plate and bearing member 68 (flanged sleeve). The sleeve surrounds the pin 64 and is snugly seated in a circular bore of the housing 10. The flanged sleeve 68 is of wear resisting but non-magnetic metal and the flange 69 is in sliding contact with the outer portions of the worm wheel which otherwise would tend to wear the main body casting. The flange 69 may be held in position against turning by a dowel pin 70.

Beyond the end of the flanged sleeve 69, in a direction away from the worm wheel 61, the pin 64 is threaded at 71 for a retaining nut such as an "elastic stop nut" 72 which bears inwardly on the housing toward the worm against a thrust washer 74. The nut and thrust washer may lie partly within a suitable cavity 74' in the housing body 10. By maintaining adequate limits between the shoulder formed by the head 65 of the pin 64 and the shoulder 66 of said pin, the worm wheel can always turn freely on the pin regardless of how tight the retaining nut 72 is clamped against the washer 74 in holding the pin 64 and the flanged sleeve 68 firmly in position.

The crank plate 75 of the worm wheel and crank plate assembly may be supported on the worm wheel 61 so that it turns therewith by a plurality of cap screws 76 extending through circumferentially spaced counterbored openings 78 in the crank plate 75 into complementary threaded holes 79 in the worm wheel 61. The heads of the screws 76 lie wholly within the counterbored portions of the openings 78.

Although the mounting of the crank plate 75 on the worm wheel 61 is shown non-adjustable, such mounting may be made adjustable in order to amplify or reduce the working area of a wiper blade of the windshield wiping unit 3 as shown in a copending application of Columbus R. Sacchini and William Waterman, Serial No. 419,734, filed November 19, 1941, now Patent 2,376,010, May 15, 1945 or as shown in a co-pending application of Columbus R. Sacchini, Serial No. 463,747, filed October 29, 1942.

The crank plate 75 is hollowed at the face thereof which lies adjacent the worm wheel 61, so as to fit around the head 65 of the worm wheel supporting pin 64. The crank pin 21 may be integral with the crank plate, and, as shown, projects from the outer face of said plate near the periphery thereof. The crank pin 21 extends into a throat slot 81 of the crosshead-constituting arm 20 for oscillating said arm and preferably bears on the arm 20 through the intermediary of a tubular bearing block 82 to avoid wear on the pin and slot.

The oscillating arm 20 is supported by the wiper drive arm shaft 18 by snugly fitting the inner end of the shaft 18 at an opening 84 near the inner or pivotally supported end of the arm 20, the two parts being retained in assembled position by means of a taper pin 85. Unidirectional constant speed rotation of the worm wheel 61 and crank plate 75 revolves the crank pin 21 which causes the arm 20 to move with substantially simple harmonic motion in oscillating the shaft 18.

Figure 6:
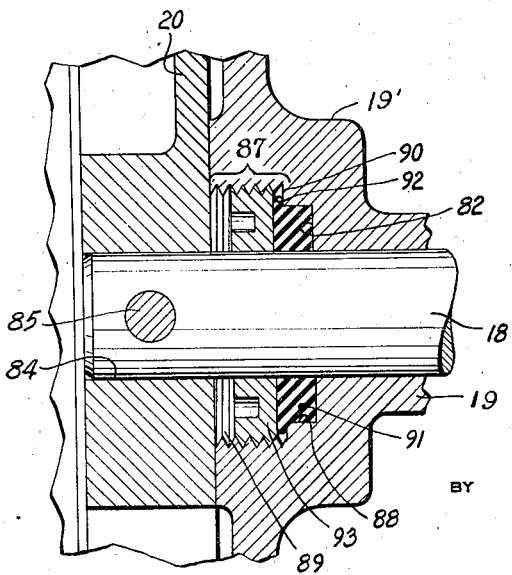
Fig. 6 is an enlarged sectional elevational view of a portion of the converter unit as shown in smaller scale in Fig. 3.

The opening in the tubular extension 19 through which the shaft 18 passes is sealed against oil leakage by a sealing assembly 87 (Figs. 3 and 6) in an enlarged portion 19' of the extension 19. The opening is counterbored from the inner face of the head 11 to form an inner cavity of intermediate diameter and an adjacent threaded cavity 89 of larger diameter defining an annular shoulder 90. An oil sealing ring 91 fits snugly in the cavity 88, being held therein by an externally threaded retaining nut 93 screwed into and lying wholly within the threaded cavity 89. The sealing ring 91 is soaked in oil, prior to assembly into its receiving recess, to prevent subsequent galling against the shaft 18. The pressure of the nut 93 against the sealing ring extrudes a slight flange 92 on said ring as shown particularly in Fig. 6; and the flange assists in locking the nut in place. The sealing ring is held by the compressive force of the nut with the inner periphery of the ring pressed tightly against the shaft 18.

The outer end of the wiper drive arm shaft 18 preferably has a frusto-conical portion 95 merging at an annular shoulder into a reduced threaded cylindrical portion 96 which portion 95 fits into a complementary frusto-conical and cylindrical opening 97 in a bracket portion 98 of a wiper blade drive arm head section 99 having a barrel portion 100 disposed transversely of the bracket 98. The window wiping unit 3, shown for purposes of illustration, is or may be the same as that disclosed by the copending application of Columbus R. Sacchini, Serial No. 463,746, filed October 29, 1942.

The head section 99 pivotally supports a bifurcated wiper blade supporting section 101 by means of a pin 103 retained in the bracket 98 by suitable means, e. g. pin 103'. The barrel portion 100 extends between the arms 102 and 102' of the section 101. The free or outer end of the section 101 may be attached in the usual manner to a wiper blade 104. As shown, a wiper blade mounting saddle 106 has a transverse bracket 106' to which is pivoted one end of a supplemental guide rod 107 of a pantograph mechanism. The guide rod may have a turnbuckle at 108 for lengthwise adjustment, maintained in adjusted position by a lock-nut 108'. The other end of the rod 107 is similarly pivoted to a bracket 155 preferably extending from the outer end of the bearing tube 19 of the converter head housing member 11. Details of the preferred form of bracket 155 will be explained in connection with Figs. 7 and 8, later herein.

The free ends of the arms 102 and 102' extend on opposite sides of the barrel portion 100 of the wiper-arm-driving head section and make operating contact with pins 109 and 109' projecting laterally from diametrically opposite sides of a cylindrical crosshead or follower 110 in said barrel portion 100. The crosshead slides easily in said barrel portion and the extensions 109 and 109' project through parallel slots in opposite respective walls of the barrel portion 100. The follower 110 is biased toward the right end of the barrel portion 100 by means of a coiled blade-pressure-maintaining spring 111, the other end of which bears against a threaded reactance block 112. A spring-force-adjusting screw 113 extends into the barrel portion 100 and through the spring and follower, the head of the screw being in abutment with one end face of the barrel portion, and the shank being threaded only into the reactance block 112. The reactance block 112 may be prevented from turning by reason of suitable lugs (one shown at 112', Fig. 1) slidable in said parallel slots in the walls of the barrel portion. Adjustment of the pressure of the wiper blade 104 on the transparent panel C may be obtained by turning the screw 113 to vary the tension of the spring 111.

The arrangement of window wiping unit is of special advantage in that the blade pressure may easily be adjusted and when the form of window deviates from planar form, as by a simple curve (e. g. cylindrical) the blade can be caused to stay in contact with the window surface. The pantograph mechanism (parts 106', 107, 155 etc.) causes the blade to wipe a greater area of the window C than could be accomplished by means of a simple wiper blade arm of the length shown.

Referring to the modified construction, particularly Fig. 7, the head body member 150 corresponds to the head body member 11 of Figs. 1 and 3. Said member 150 has pad formations at 151 and 152 for supporting an attachment bracket (not shown), each of the pads having a screw receiving opening as at 153 by which such bracket can be secured in face to face contact with the pads.

Figs. 7 and 8 show the adjustable supporting means for the blade control link 107 of the pantograph mechanism including the bracket 155 which, as preferred, is adapted to be clamped to the drive shaft bearing sleeve 19 of the housing member 150. The bracket 155 is preferably made of a single piece of sheet metal bent into U-shape providing parallel arm portions 157 having aligned openings 157' for receiving the bearing sleeve 19. One arm portion 157 extends laterally from the sleeve 19 in position to carry a pivotal attachment pin 158 for the link 107. Lengthwise adjustment for said link is constituted by the turnbuckle sleeve 108 and lock-nut already described. The parallel portions 157, where the same fit over the bearing sleeve 19, may be adjusted along the sleeve toward and away from the principal plane of the window or sight glass C and the bracket may be turned about the axis of the bearing sleeve 19 to any desired position, thus to move the pin 158 toward and away from said axis. Clamping of the bracket is effected by a bolt 160 passing through looped portions 159 of the plate 157, which looped portions are slightly separated, as clearly shown, in order to enable a clamping bolt 160 and nut 161 to clamp the bracket in adjusted position on the sleeve 19. The adjustable bracket described above enables the link-supporting pin 158 to be moved toward and away from the axis of the wiper arm drive shaft 18 to vary the action of the pantograph mechanism; and, in order that such variation will not cause the blade 104 to operate in non-centered relation to the transparent panel, the variation may be compensated by lengthening and shortening of the link 107 at the turnbuckle 108. Thus, if desired, one can, by positioning the bracket 155 as shown in Fig. 7, cause the wiper blade 104 shown on Fig. 2 to operate so that the side limits of its cleaning area or field of operation are more nearly parallel to the side portions of the frame B, than when the bracket is turned to other positions; because by moving the pivot pin 158 toward the axis of the drive shaft 18 the side limits of the wiper area diverge at a greater angle in the general direction of extent of the wiper arm 101 (Figs. 1 and 2). If the arm 106' of the wiper blade mounting is made sufficiently shorter than the effective supporting arm for the link attaching pin 158, then the blade can be caused to clear an area with parallel sides, and the shape and amplitude of such area can be changed by the adjustments described above.

Referring to Fig. 9 this shows the worm shaft 162 corresponding to the worm shaft 41 of Fig. 4 supported in anti-friction roller bearing assemblies 163 and 164 in opposite parts of the main body or housing member 165, which latter corresponds to the main housing 10 of Figs. 1 to 5. The bearing rollers 164 occupy a dead end bore 166 in said main body member and the rollers 163 occupy a bearing housing 167 which fits tightly into a complementary through bore 168 of the main body and is held in place by a bore closure nut 169 threaded into a counterbored portion of the opening 168. The nut 169 engages a soft metal sealing disc 170 abutting a flange 171 of the bearing housing 167 which flange, in turn, abuts the effective bottom of the counterbore to limit the inward movement of the bearing housing. The inner end of the bearing housing 167 is positioned to abut a thrust washer 172 loosely surrounding the worm shaft 162 and which receives the operating axial thrust of the worm 58. Said worm 58 may be essentially the same in construction as the worm shown in Figs. 3 and 4 of the previously described construction.

In order to insure a supply of lubricant for the rollers 163 the housing 167 preferably has a cross slot at 174, the upper portion of which is substantially in the plane of rotation of the worm wheel 61. Thus lubricant is occasionally thrown off the worm wheel into the slot from whence it can easily travel along the worm shaft to the bearing rollers.

The connection between the power input shaft 175, Fig. 10 (corresponding to the shaft 27 of Fig. 5), and the worm shaft comprises a pair of helical gears 176 and 177, the former being keyed or pinned to a reduced inner end portion 178 of the shaft 175 and the latter being similarly secured to the main worm shaft 162. The operating axes of the helical gears do not have to be as accurately located for smooth operation as is the case with miter gears. Preferably the helical gears have end notches 176a and 177a which receive cross pins 179 and 180 respectively extending through the respective shafts and driven tightly into supporting holes in said shaft.

The relatively enlarged outer portion of the shaft 175 preferably has two identical sets of supporting rollers at 181 in the tubular part 25 of the main housing member 165. The outer set of rollers 181 (right, Fig. 10) are retained in position by the shaft coupling 34 (see Fig. 5), when the same is secured to the tubular extension 25 as previously described, and the inner set of rollers 181 are retained in position by a short flanged sleeve 182 pressed into the inner end of the bore which forms the outer raceway for the rollers. A thrust washer 183 outwardly abuts the sleeve 182 and inwardly abuts the hub of the helical gear 176. The outer end of the shaft 175 is provided with a non-circular socket 185 for receiving the driving end of the flexible shaft (or of a motor shaft in case the motor is mounted directly on the main housing). The reduced portion 178 which projects inwardly beyond the helical gear 176 is received into a complementary socket (not shown) in the head body member 150.

Assuming that the shaft 175 is turned always counterclockwise, as viewed in Fig. 9, the axial thrust of the worm 58 will be toward the thrust washer 172 (see arrow on worm shaft, Fig. 9) and the axial thrust of the lower helical gear 176 will (as indicated by the arrow on Fig. 10) be toward the thrust washer 183.

I claim:

1. In a window wiping mechanism, a wiper arm drive shaft, means arranged to impart alternate rotary motion to said shaft, a bearing sleeve surrounding and supporting said shaft, a clamp bracket comprising an openly folded piece of sheet metal providing parallel spaced arms with aligned apertures fitting the sleeve, said arms being connected by a loop of the sheet metal which loop receives a clamping bolt, said loop having portions spaced apart axially of the bolt and with the space therebetween connected with the apertures, said bracket being attachable to the sleeve in a number of different turned positions thereon, a link for controlling the motion of a wiper blade driven by said shaft, and pivot means on the clamp bracket arranged to pivotally support the link with the pivot axis disposed different distances from the drive shaft axis in accordance with the turned position of the clamp bracket on the sleeve.

2. A motion converter unit for driving an oscillatable wiper arm, said unit including a casing forming a support for a worm wheel and an output shaft for connection to such wiper arm, said shaft being connected to the worm wheel by a scotch yoke mechanism in the casing, an input shaft journalled in the casing parallel to the output shaft and on the opposite side of the casing therefrom, a worm shaft with a worm thereon in mesh with teeth of the worm gear, and a gear couple connecting the input shaft with the worm shaft and including a gear member fixed to the worm shaft and maintained operatively in abutting relation to the worm in an axial direction when the input shaft is turned in normal direction.

3. In a motion converter mechanism, a casing adapted to contain lubricant, a drive shaft and a worm shaft extending transversely of the drive shaft, a pair of gears on said shafts, a worm on the worm shaft, a motion converting crank-driving worm wheel mounted within said casing to turn on an axis parallel to the drive shaft, supporting means for the drive shaft and worm shaft including a set of anti-friction rollers for one of said shafts, a housing in said casing for the rollers and an opening in the housing communicating with a container space for the rollers in said housing, said opening being exposed at one end in the plane of the worm wheel so as to receive lubricant thrown from the worm wheel.

COLUMBUS R. SACCHINI.